Oct. 14, 1958

E. ROHACS 2,856,035

HYDRAULIC SHOCK ABSORBER

Filed Nov. 6, 1953

INVENTOR.
E. Rohacs
BY
Glascock Downing Seebold
ATTYS.

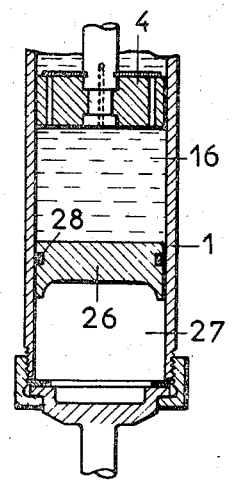
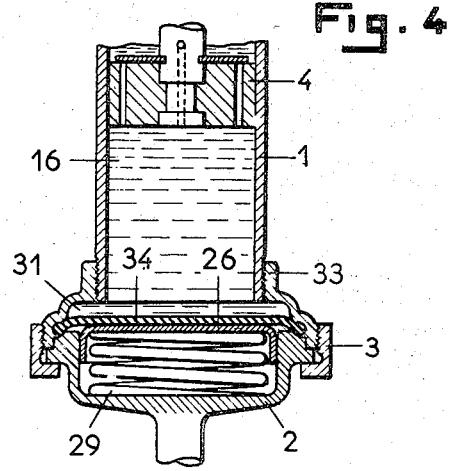
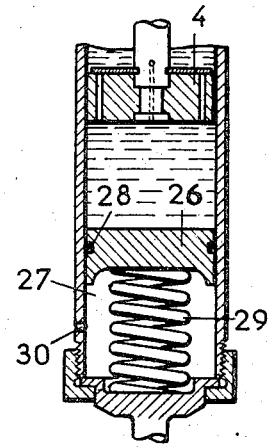
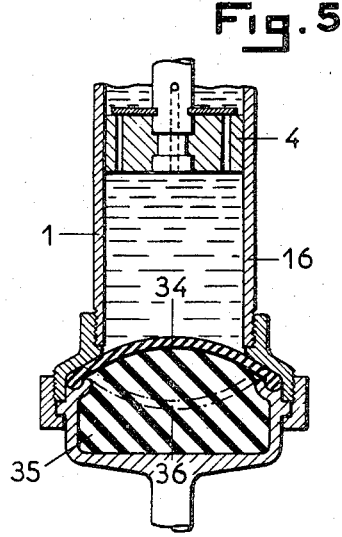

Oct. 14, 1958          E. ROHACS          2,856,035

HYDRAULIC SHOCK ABSORBER

Filed Nov. 6, 1953          3 Sheets-Sheet 3

INVENTOR.
E. Rohacs
BY
ATTYS.

United States Patent Office 2,856,035
Patented Oct. 14, 1958

2,856,035

HYDRAULIC SHOCK ABSORBER

Etienne Rohacs, Saint-Gratien, France, assignor to Société d'Applications des Machines Motrices, Boulogne-Billancourt, France Application November 6, 1953, Serial No. 390,703

Claims priority, application France November 12, 1952

5 Claims. (Cl. 188—88)

The invention relates to a shock absorber particularly for automobile vehicles in which the chamber which does not contain the piston rod has an internal volume capable of varying in response to the variations of pressure resulting from the movements of the piston.

According to the present invention provision is made of a third chamber and of communication means with the chamber containing the piston rod in order that the latter chamber may at all times be kept fully replenished and filled with hydraulic fluid, particularly at the beginning of a compression movement and before the opening of the communication means between the two chambers of the shock absorber.

Embodiments of the invention, chosen by way of example, will be described hereunder with reference to the accompanying drawings. The applicant however does not wish to limit the general scope of the invention to or by the particular details peculiar to the examples chosen purely by way of illustration.

In the said drawings:

Figure 2 is a diagrammatic axial section of an alternative form of the shock absorber according to the invention;

Figure 3 is a diagrammatic axial section of a further alternative form of the shock absorber according to the invention; and Figures 4, 5, 6 and 7 illustrate further alternative forms.

Figure 1:
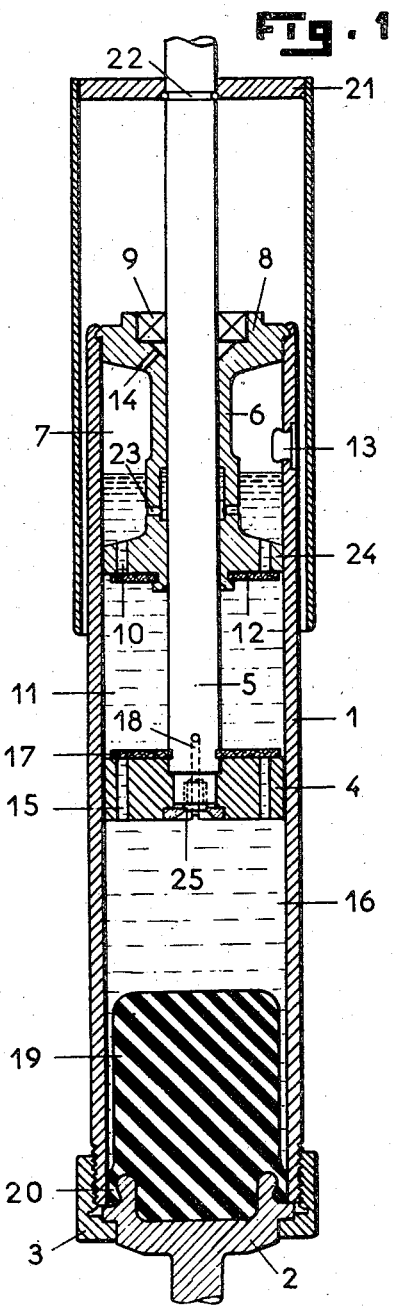
Figure 1 is a diagrammatic axial section of a shock absorber according to the invention.

In the drawings, Figure 1 is a cylindrical casing of a shock absorber according to the invention. This casing is closed at its bottom by a cap 2 having an extension in the form of suitable attachment and connection means. The cap 2 is secured by a nut 3 screwed on to the threaded extremity of the casing 1. Inside the casing 1 is a piston 4 of which the rod 5 comprises at its other end any suitable attachment and connection means. The upper part of the rod 5 projects outside the casing 1 through a tubular member 6 forming a piston rod guide. The tubular member 6 has an upper, laterally extending flange 8 secured to the top of casing 1 and a lower, similarly extending flange 24 axially spaced from flange 8 and bearing against the interior of casing 1 so as to define a cylindrical annular chamber 7 between the flanges of tubular member 6 and the interior of casing 1.

The upper flange 8 of the member 6 mounts a scraper packing 9 that prevents damping liquid or oil from rising and which also prevents dust and dirt from getting into the shock absorber. The lower flange 24 of the tubular member 6 has axially directed openings such as 10 therein providing communication between the annular chamber 7 and the upper chamber 11 of the cylinder, that is, the part of the interior of the casing between the upper surface of the piston 4 and the lower surface of flange 24, as viewed in the drawings.

The openings 10 can be closed by a valve 12 of annular shape mounted on the face of flange 24 directed forward the chamber 11.

A filling and oil level orifice 13, closed by any suitable blocking means, is provided in the wall of casing 1 intermediate flanges 8 and 24 and through which the interior of the casing is filled with oil or other suitable damping liquid approximately to the level of orifice 13.

Below the packing 9 there is a circular groove for collecting any oil which may have risen along the shaft 5; this oil being returned to the annular chamber 7 through the duct 14.

Since the packing 9 is merely for preventing liquid or oil from escaping out of chamber 7, and preventing the entry of dust and dirt into the shock absorber, it is believed clear that when the cap is removed from filling orifice 13, and the shock absorber is initially filled with oil up to the level of the filling orifice 13, and that orifice is then closed, the space in chamber 7 above the oil level is at substantially atmospheric pressure.

The piston 4 has axially directed channels 15 therethrough which provide communication between the upper chamber 11 of the cylinder and the lower chamber 16. These channels or passages 15 can be closed by an annular valve 17 mounted on that side of the piston 4 that faces chamber 11. This valve, and also the valve 12, may consist of a ring of rubber or flexible plastic.

The piston rod 5 is provided with a duct 18 which also allows free communication between the chambers 11 and 16, and has a cross-sectional area substantially smaller than the total cross-sectional area of the channels 15.

This duct 18 will preferably be provided with a regulable or non-regulable nozzle 25, as shown diagrammatically in Figure 1. In other words, the duct 18 and nozzle 25 constitute means establishing a throttled communication between the two chambers 11 and 16 separated by the head of piston 4.

For the sake of simplicity it has been assumed in the above description that the piston 4 is a single-acting piston. There is no technical difficulty in using a double-acting piston, in which case a second valve similar to valve 17 is placed on the lower face of the piston.

The lower chamber 16 contains in its lower part a cellular body 19 of which the cells contain a compressible gas. The body 19 can consist of, for instance, sponge rubber under an envelope which is flexible and cannot be attacked by the liquid of the shock absorber. This envelope may be made of rubber or it may consist of a metal bellows. The flexible body may be fixed by clamping its edges between a rib on the cap 2 and the interior of the lower end of casing 1, as shown at 20.

It must of course be understood that in this case the cellular body acts as a framework in the flexible envelope, compressibility being ensured by the gas contained in the cells of the sponge rubber. It would equally well be possible to use, with no envelope, a cellular body with closed cells containing for instance nitrogen; such cellular bodies are commonly employed in industry.

The rod 5 of the piston carries a retaining ring 22 for attaching a casing 21 sliding externally on the casing 1; this casing may be replaced by a skirt or any similar closure means.

The principle on which the apparatus operates, which will be explained hereinafter, does not require absolute tightness between the chambers 11 and 7; in particular, the ducts 23 allow oil, tending to escape along the rod 5, to pass into the chamber 7.

The manner of operation is as follows:

In the drawing, the piston 4 is shown in a mean position.

Let it be assumed that a shock transmitted to the cap 2 tends to cause the casing 1 to rise, i. e. imparts to the piston 4 a relative movement towards the bottom of the drawing; it is assumed that the shock absorber is filled with oil or with a suitable liquid approximately to the level of the orifice 13; the oil will pass from the chamber 16 to the chamber 11 through the channels 15, lifting the valve 17. The increase in pressure in the chamber 11 tends to close the valve 12. The displacement of the piston 4 tends to produce in the chamber 16 a variation in volume which is greater than the variation in volume of the chamber 11. The cellular body 19 and the gas which it contains will therefore tend to be compressed in such a manner as to produce equilibrium of pressure between the two chambers 11 and 16 for a given position of the piston 4.

After the shock has been absorbed, the return movement which takes place in the opposite direction is equivalent to a relative movement of the piston 4 towards the top of the drawing. In this movement, the valves 17 and 12 are closed as a result of the increase in pressure in the chamber 11, and the oil cannot pass from the chamber 11 to the chamber 16 except through the duct 18, and thus bleeds into chamber 16 which damps the return movement. The arrangement may be such that at the end of the movement the inlet or upper orifice or orifices of the duct 18 in the chamber 11 will be blocked by the member 6, in such a manner as to stop the relative movement by a liquid cushion and thus to limit the return movement by means other than the impingement of metal on metal.

The alternative forms shown in Figures 2 to 4 differ from the embodiment shown in Figure 1 only in the manner in which the variability of the volume of the lower chamber is produced. Therefore, the same reference numerals have been retained for those parts which remain the same, and also only the lower part of the shock absorber, including the piston 4, has been shown.

In the embodiment shown in Figure 2, the volume 10 of sponge rubber is omitted and is replaced by a piston 26 having a skirt, thus creating a fourth chamber 27 full of air or gas; tightness between the two chambers 16 and 27 is ensured by sealing joints of which only one is shown, at 28. The air or gas filling chamber 27 is not under previous pressure and is not intended to sustain normally the weight of the vehicle body or equivalent.

The manner of operation is exactly the same, the chamber 27 representing the variable volume in this case.

In the embodiment shown in Figure 3, a certain number of suitably calibrated springs 29 are arranged in the chamber 27, the action of these springs either assisting that of the air enclosed in the chamber 27, or replacing the action of the air if the chamber 27 is in communication with the atmosphere through the duct 30. These springs are not intended to support normally the weight of the vehicle or equivalent.

Figure 4 shows only a variant of the construction shown in Figure 3, which can be employed also in the construction shown in Figure 2.

In this example, the tightness of the piston is ensured by a flexible diaphragm 34. Also by way of alternative, the piston 26 instead of moving in the cylinder 1 of the shock absorber moves in a chamber 31 following said cylinder, this chamber 31 being produced by screwing the nut 3 of Figure 1 not directly to the cylinder 1 itself but through the intermediary of a flared tubular connection member 33.

The periphery of the diaphragm 34 is clamped between the cap 2 and the connection member 33 to ensure tightness.

Figure 6:
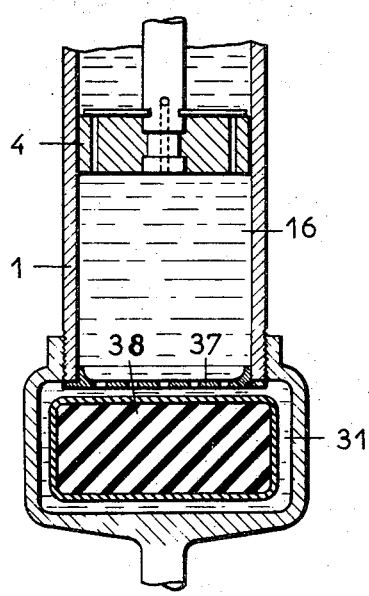
Figure 7:
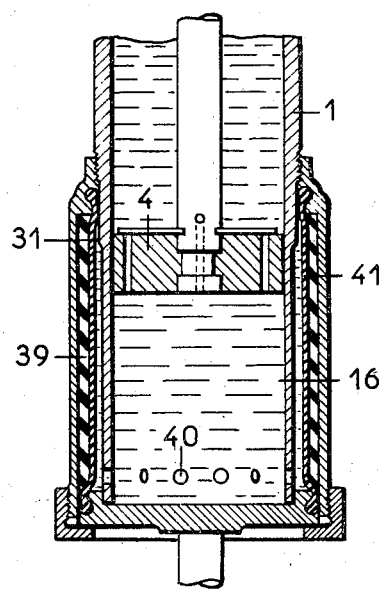

Figures 5, 6 and 7 may also be regarded as variations of Figure 4 in the sense that the variable volume is transferred outside the cylinder 1 and is produced in a chamber adjacent to this cylinder.

Figure 5 is similar to Figure 4 but the piston 26 is omitted and is replaced by a cellular body 35, for instance of sponge rubber. The pressure exerted by the piston 4 causes the diaphragm 34 to occupy the position shown in broken lines at 36.

In Figure 6, the compressible cellular body is in the adjacent chamber 31 attached to the cylinder 1. This chamber 31 being separated from the chamber 16 of the cylinder 1 by a grating 37 and the compressible cellular body 38, under an envelope or without an envelope, floats in the oil which passes freely from the chamber 16 to the chamber 31 through the holes in the grating 37.

In Figure 7, the chamber 31, instead of being attached to the base of the cylinder 1, extends externally of the latter and coaxially therewith.

In the annular space between the outer walls of the cylinder 1 and the inner walls of the chamber 31 is arranged the cellular body 39.

The oil under pressure passes from the inside of the cylinder 1, i. e. from the chamber 16, into the annular space through communication holes 40.

In the example illustrated, a flexible envelope 41 is provided which isolates the cellular body 39 from the oil under pressure.

The drawing shows the shock absorber at rest, i. e. without pressure either above or below the piston 4. If the piston 4 descends, the pressure will increase in the chamber 16 of which the volume will increase by reason of the compression to which the cellular body 39 will be subjected. This is therefore a true example of a chamber having a volume variable in response to the variations of pressure produced by the movement of the piston.

In the appended claims the expression "homogeneous structure" denotes a structure the different parts of which are of the same kind, and the words "solid substance" are to be understood in contradistinction to gaseous or liquid substances.

I claim:

1. In a shock absorber of the type including relatively movable cylinder and piston means, said piston means being within the cylinder, a piston rod connected to the piston, and extending therefrom through and beyond one end of the cylinder, said piston separating the interior of the cylinder into two chambers comprising a first chamber through which the piston rod extends and a second chamber on the opposite side of the piston, means within the cylinder defining a third chamber, a damping liquid filling said first and second chambers and partially filling said third chamber, means operable to establish and control a flow of displaced liquid between said first and second chambers during relative reciprocation of the cylinder and piston means, said last mentioned means including port means through the piston rod which terminates in communication with the first chamber at a point spaced axially from the piston to establish a throttled flow of liquid from one chamber to the other upon relative cylinder and piston movement, and means operable to establish an increased flow of liquid from said second chamber to said first chamber upon relative movement of said piston away from said third chamber, said second chamber having associated therewith adjacent the end thereof remote from the first chamber, means establishing within the second chamber a movable wall so that the internal volume of the second chamber is variable in response to variations in pressure resulting from relative movement of the piston within the cylinder due to shock, and means providing communication between said third and said first chamber, including means operable to establish a flow of liquid from said third chamber to said first chamber upon relative movement of said piston away from said third chamber and to prevent flow of liquid from said first chamber to said third chamber upon a continuous relative movement of said piston toward said third chamber.

2. In a shock absorber of the type including relatively movable cylinder and piston means, said piston means being within the cylinder, a piston rod connected to the piston, and extending therefrom through and beyond one end of the cylinder, said piston separating the interior of the cylinder into two chambers comprising a first chamber through which the piston rod extends and a second chamber on the opposite side of the piston, means within the cylinder defining a third chamber adjacent said first chamber, a damping liquid filling said first and second chambers and partially filling said third chamber, the space within said third chamber above the liquid level therein being at least substantially at atmospheric pressure at least when the shock absorber is initially charged with damping liquid, means operable to establish and control a flow of displaced liquid between said first and second chambers during relative reciprocation of the cylinder and piston means, said last mentioned means including port means through the piston rod which terminates in communication with the first chamber at a point spaced axially from the piston to establish a throttled flow of liquid from one chamber to the other upon relative cylinder and piston movement, and means operable to establish an increased flow of liquid from said second chamber to said first chamber upon relative movement of said piston away from said third chamber, a compressible body associated with the end of the second chamber remote from the piston so that the second chamber has an internal volume that is variable in response to variations in pressure resulting from relative movement of the piston within the cylinder due to shock, and means providing communication between said third and said first chamber, including means operable to establish a flow of liquid from said third chamber to said first chamber upon relative movement of said piston away from said third chamber and to prevent flow of liquid from said first chamber to said third chamber upon a continuous relative movement of said piston toward said third chamber.

3. In a shock absorber as claimed in claim 1 and in which the means establishing within the second chamber a movable wall comprises a compressible body lodged within said second chamber.

4. In a shock absorber as claimed in claim 1 and in which the means establishing within the second chamber a movable wall comprises a gas containing cellular body and a flexible envelope surrounding the same.

5. In a shock absorber as claimed in claim 1 and in which the means establishing within the second chamber a movable wall comprises another piston means within said second chamber and elastic means resisting the movement of said another piston means in a direction away from said third chamber.

References Cited in the file of this patent
UNITED STATES PATENTS

| | | |
|---|---|---|
| 1,886,712 | Messier | Nov. 8, 1932 |
| 2,314,404 | Katcher | Mar. 23, 1943 |
| 2,357,278 | O'Connor | Aug. 29, 1944 |
| 2,367,977 | Thornhill | Jan. 23, 1945 |
| 2,410,176 | Magrum | Oct. 29, 1946 |
| 2,417,504 | Knaggs et al. | Mar. 18, 1947 |
| 2,538,375 | Montgomery | Jan. 16, 1951 |
| 2,571,279 | Myklestad | Oct. 16, 1951 |
| 2,628,692 | Hufferd | Feb. 17, 1953 |
| 2,701,714 | Harwood | Feb. 8, 1955 |

FOREIGN PATENTS

| | | |
|---|---|---|
| 296,897 | Great Britain | Sept. 13, 1928 |
| 671,712 | Great Britain | May 7, 1952 |
| 705,634 | Germany | May 5, 1941 |